DIMMING SYSTEM FOR GASEOUS DISCHARGE LAMPS

Original Filed March 21, 1960 2 Sheets-Sheet 1

Inventor:
Gordon M. Bell,
by Henry J. Marcinak
Attorney.

DIMMING SYSTEM FOR GASEOUS DISCHARGE LAMPS
Original Filed March 21, 1960 2 Sheets-Sheet 2
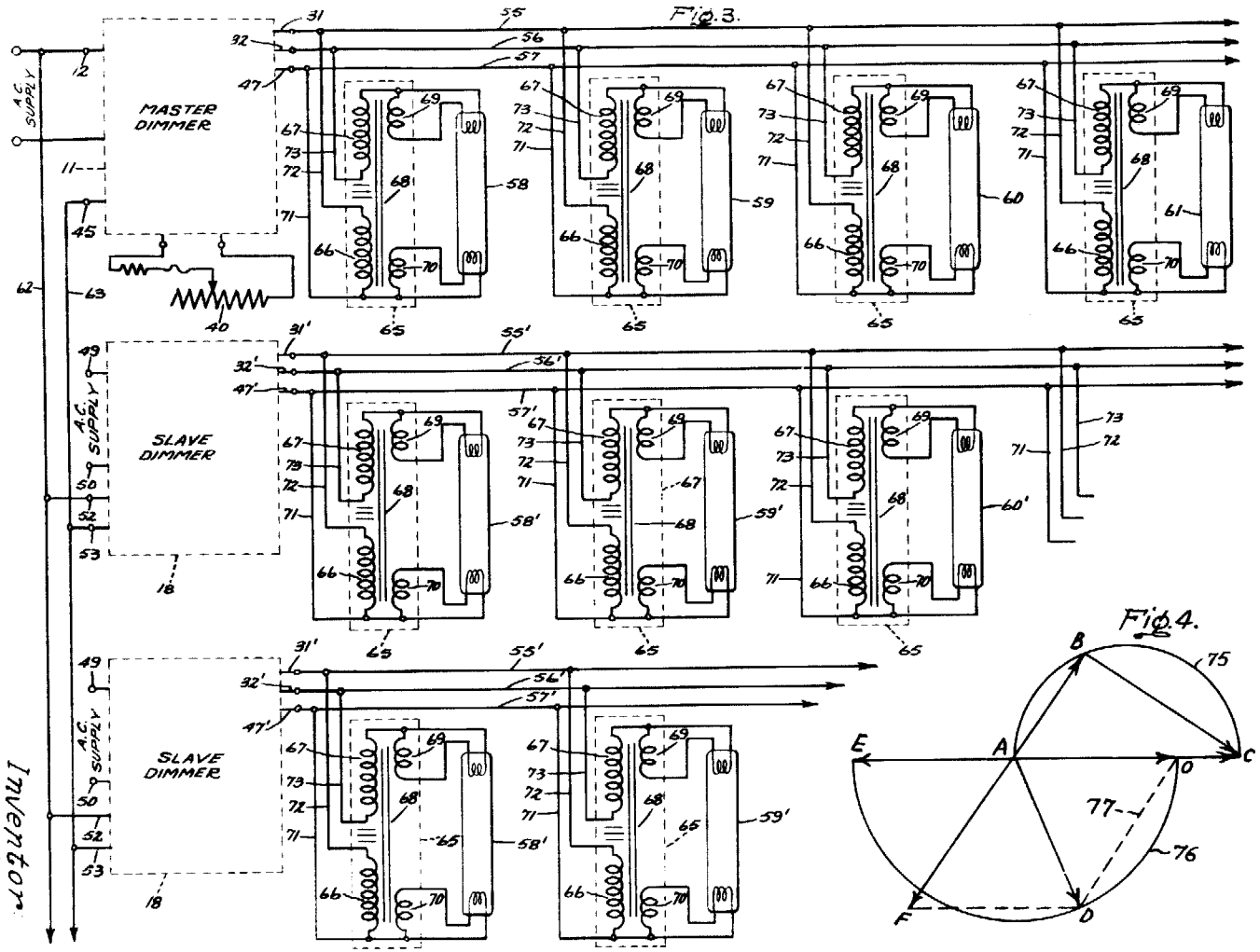
Inventor
Gordon M. Bell,
by Henry J. Moriniere
Attorney.

United States Patent Office

Re. 25,989
Reissued Mar. 22, 1966

25,989

DIMMING SYSTEM FOR GASEOUS DISCHARGE LAMPS

Gordon M. Bell, Fort Wayne, Ind., assignor to General Electric Company, a corporation of New York Original No. 3,031,598, dated Apr. 24, 1962, Ser. No. 16,577, Mar. 21, 1960. Application for reissue Dec. 3, 1963, Ser. No. 335,453
5 Claims. (Cl. 315—201)

Matter enclosed in heavy brackets [ ] appears in the original patent but forms no part of this reissue specification; matter printed in italics indicates the additions made by reissue.

This invention relates to electrical dimming systems for gaseous discharge lamps such as fluorescent lamps, and more particularly to such a system for controlling the luminous intensity of a plurality of lamp banks from a central intensity control.

Phase shifting networks have been used in lamp dimming systems to drive electronic switches, such as thyratrons, for the purpose of adjusting the interval of current conduction during each half cycle of an alternating voltage and thereby regulate the light intensity level of a plurality of lamps. Such a phase shifting circuit is controlled by a variable resistance or intensity control. As the value of resistance is varied from zero to maximum, the light intensity level of the lamps is correspondingly varied. The number of lamps that can be operated from a circuit of this type is limited by the volt ampere rating of the electronic switch.

Heretofore, to regulate a relatively large number of lamps, the resistances of the intensity control were connected in parallel or the resistance potentiometers were ganged mechanically in order to provide a single control for a group of substantially identical circuits. A disadvantage in paralleling control resistances is that the resolution of the control is affected and it is difficult to obtain a smooth and continuous control over a wide range of luminous intensity level. Dimming system applications in which the intensity controls or resistance potentiometers are mechanically ganged possess the inherent disadvantage that all intensity controls must be grouped together at a single location which results in bulky equipment and an unnecessary duplication of parts.

Accordingly, an object of this invention is to provide an improved dimming system in which a plurality of fluorescent lamps can be operated at various levels of luminous intensity from a single variable impedance control.

Another object of the present invention is to provide a dimming system for the operation of a large plurality of lamp banks having a simplified and positive dimming control over a wide range of dimming control settings.

It is another object of the invention to provide a dimming control circuit which can be readily adjusted to provide the desired load currents for various levels of luminous intensity for a plurality of lamps.

Still another object of the invention is to provide an improved dimming control circuit which is rugged and reliable over a wide range of luminous intensity levels.

It is still a further object to provide an improved dimming control circuit which is comparatively inexpensive to fabricate and manufacture.

The foregoing and other objects and advantages are realized by a dimming system comprised of a master dimming circuit and one or more slave circuits, each of which include a pair of gas triodes. One triode is turned on each positive half cycle and the other triode is turned on each negative half cycle in order to provide controlled flow of current to the discharge devices. For maximum lamp current, the gas triodes are fired at the start of each half cycle, and for low lamp current and low light output they are fired late in the half cycle. The point in the cycle at which the gas triodes are fired is controlled by the grid voltage of the triode. A sinusoidal voltage of substantially constant amplitude but variable in phase difference with respect to the line voltage is applied to the grid in both the master dimming circuit and slave units, the applied grid voltage or control voltage being the vector sum of a voltage component which is constant in voltage and phase and a component which is variable in voltage and phase. The magnitude and phase of the latter component is determined by a variable impedance or intensity control.

In accordance with the invention, the master dimming circuit furnishes these control components to the one or more slave dimming circuits. In this manner, the master dimming circuit provides a signal to the individual slave dimming units and synchronously fires one half of all the gas triodes in the dimming control system at approximately the same point in the positive half of each cycle and the other half of all the gas triodes in the negative half of each cycle. By adjusting the variable impedance or intensity control of the master unit, the interval of current conduction during each half cycle of the alternating current voltage supply to a plurality of slave units can be precisely controlled by the intensity control of the master dimming unit.

The subject matter which I regard as my invention is set forth in the appended claims. The invention itself, however, together with further objects and advantages thereof may be understood by referring to the following description taken in connection with the accompanying drawings in which:

FIG. 3 is a schematic circuit diagram illustrating an embodiment of the invention in which the external interconnections of the master dimming circuit shown in FIG. 1 and the slave dimming circuit of FIG. 2 are shown in a dimming system for a plurality of lamp banks; and FIG. 4 is a vector diagram illustrating the grid circuit voltages.

Figure 1:
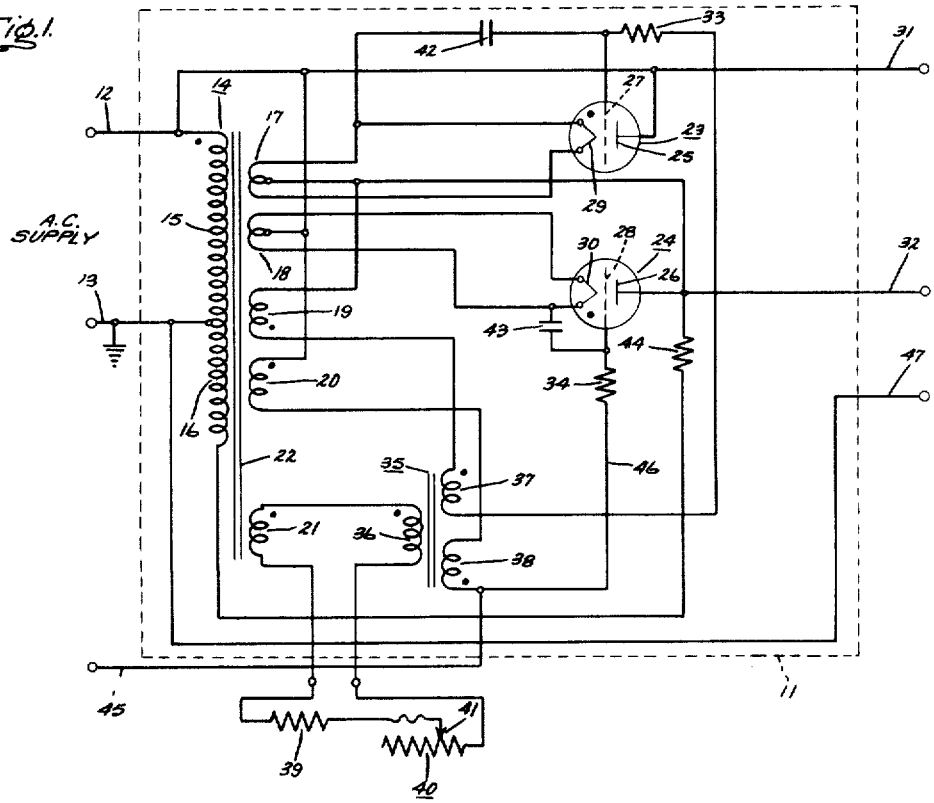
FIG. 1 is a schematic circuit diagram of a master dimming circuit used in an embodiment of the invention.

Referring now to FIG. 1, the master dimming circuit is shown enclosed in the dashed rectangle 11. The input leads 12, 13 are provided for connection with an alternating current supply (not shown). A transformer 14 includes primary winding 15, a secondary winding 16 in autotransformer relationship therewith, a pair of cathode heating windings 17, 18, two grid circuits secondary windings 19, 20 and a grid control secondary winding 21 magnetically coupled with the primary winding 15 on a magnetic core 22.

Electronic switches shown in the illustrated embodiments of the invention are filamentary type hot cathode gas filled triodes of the controlled ionization type generally referred to as thyratrons. It will be appreciated that other types of tubes can be used or semiconductive devices such as the silicon controlled rectifier may be used. The thyratron is a suitable electronic switching means since it is an asymmetrical conductor and can be readily switched on during a portion of the power half cycle. As is well-known, the thyratron will pass a unidirectional current through its anode at an instant when the anode is positive with respect to the cathode and the instantaneous grid potenial is zero or slightly positive.

A pair of gas triodes 23, 24 having anodes 25, 26, grids 27, 28 and cathodes 29, 30, respectively, are used so that the conduction of the current supplied to the load through output leads 31, 32, 47 can be controlled during both the positive and the negative half of the alternating current cycle.

A phase shifting circuit is provided in order to supply an alternating voltage variable in phase relative to the voltage impressed on the anodes 25, 26 and includes resistors 33, 34, a transformer 35 having a primary winding 36 and secondary windings 37, 38, the secondary winding 21 of the transformer 14, a resistor 39 and the variable impedance of intensity selector 40 having an adjustable tap 41.

It will be seen that the gas triode 23 derives its voltage across cathode 29 and grid 27 from the secondary winding 19 of transformer 14 and from the secondary winding 37 of transformer 35. Similarly, the gas triode 24 derives its voltage across cathode 30 and grid 28 from the secondary winding 20 of transformer 14 and from the secondary winding 38 of transformer 35. The sum of the voltages across secondary windings 19, 37 results in a sinusoidal voltage of constant amplitude but variable in phase. Likewise, the sum of the voltages across the secondary windings 20, 38 results in a sinusoidal voltage of constant amplitude but variable in phase difference with respect to the source voltage depending upon the amount of the resistance in series with the primary winding 36. Since the two triodes 23, 24 are connected back to back, it will be seen that the voltages across secondary windings 19, 37 will cause the triode 23 to conduct during each half cycle of one polarity. The voltages across secondary windings 20, 38 will cause triode 24 to conduct during each half cycle of opposite polarity.

If a sinusoidal voltage variable in its phase difference with respect to the source voltage is applied to the grids 27, 28 of triodes 23, 24, the triode will fire or conduct when its anode is positive with respect to its cathode and its grid voltage is zero or slightly positive. By changing the phase difference, the point in the cycle at which the grid voltage is zero or slightly positive with respect to the cathode can be controlled. As the adjustable tap 41 is moved to decrease the resistance in series with the primary winding 36, the phase difference between the grid and anode voltage of the triodes 23, 24 increases and consequently the interval of nonconduction of the gas triodes 23, 24 increases. Conversely, when the resistance is increased, the phase difference decreases and the interval of current conduction of the gas triodes 23, 24 increases during each half cycle during which they conduct.

A capacitor 42 is connected across the cathode 29 and grid 27 of gas triode 23 in order to suppress line surges which might cause the triode 23 to fire prematurely in the cycle. In a similar manner, a capacitor 43 is connected across the cathode 30 and grid 28 of triode 24. The resistors 33, 34 are connected in circuit with the grids 27, 28, respectively, to limit the grid current to a small value. The resistor 44 is connected in circuit with lead 32 so that lamp operation at very low levels of luminous intensity can be stabilized by draining off any residual charge from the line after each pulse of current. The center tap secondary windings 17, 18 serve to energize the cathodes 29, 30 of the gas triodes 23, 34. A third lead 47 connected with the low potential or grounded lead 13 is provided and together with the two other leads 31, 32 supplied power to a bank of lamps as shown in FIG. 3.

An external lead 45 is brought out from conductor 46 which connects the [primary] *secondary* winding 38 with resistor 34. External lead 45 and lead 12 provide connections for the control output of the master dimming circuit or dimmer. Thus, the control voltage components of the master circuit are used also for the purpose of regulating the current conduction in the triodes of the slave dimming circuits or dimmers.

When the gas triode 23 is in a conducting state, it will be seen that a path is provided for current flow from the external lead 31 through the triode 23, and the center tap secondary winding 17, to lead 32. When triode 24 is fired and triode 23 has reverted to a blocking state, a path of current flow is provided from lead 32 through triode 24 and the center tap secondary winding 18 to the high potential lead 31 of the power supply. It will be seen, therefore, that whenever the triodes 23, 24 are in a conducting state, the output leads 31, 32 are in closed circuit relationship. Thus, the gas triodes 23, 24 function as switches to close or to connect in circuit the two output leads 31, 32 for a fixed interval during the positive and negative half cycles thereby regulating the amount of power supplied to the lamps.

Figure 2:
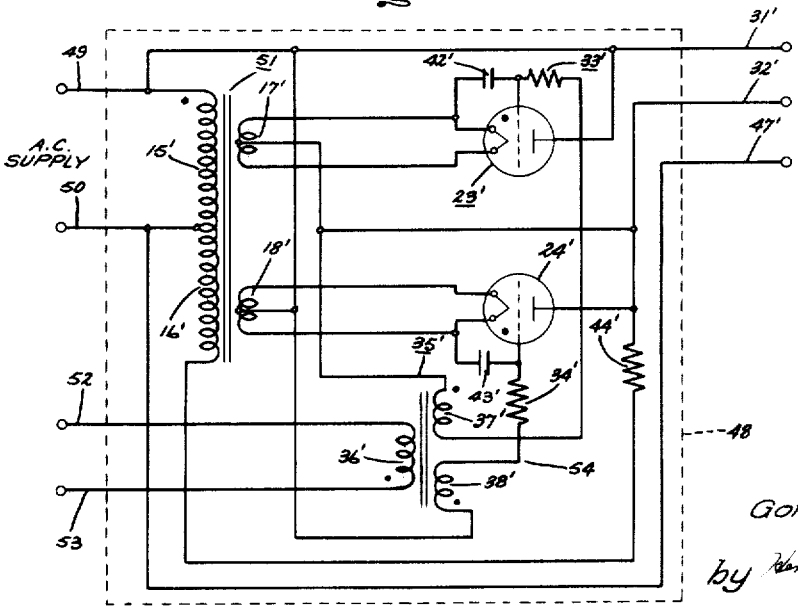
FIG. 2 is a schematic circuit diagram of the slave dimming system in accordance with the invention.

A schematic circuit diagram of a slave dimming circuit is shown in FIG. 2 enclosed in the dashed rectangle 48. Like reference numerals identify corresponding parts of the master dimming circuit of FIG. 1 which are duplicated in the slave dimming circuit, the like numerals in FIG. 2 being primed. Referring now to FIG. 2, it will be seen that triodes 23', 24' of the slave circuit are connected back to back, so that one will be fired during each positive half cycle of the alternating current source and the other will be fired during each negative half cycle. A transformer 51 has center tap cathode windings 17', 18', a secondary winding 16' magnetically coupled with primary winding 15'. Since the master circuit supplies the phase shifting voltage components required for control of the interval of conduction of the triodes 23', 24' of the slave circuit, the need for an intensity control and additional control windings on transformer 51 has been eliminated in the slave circuits. The capacitors 42', 43' and resistors 33', 43' and 44' serve the same purpose as the corresponding capacitors 42, 43 and resistors 33, 34 and 44 of the master dimming circuit of FIG. 1.

The gas triodes *23'*, [23.] 24' are identical with the gas triodes 23, 24 used in the master dimming circuit. Three terminal leads 31', 32', 47' are provided for connection with ballast circuits. It will be appreciated that the number of these external leads brought out of master and slave circuits will, of course, depend upon the requirements of a specific ballast circuit used in the system, and that a minimum of three leads are required. Input leads 49, 50 are provided for connection with a suitable alternating current supply which is in phase with the alternating current supply of the master circuit. The control input leads are provided for connection in circuit with the high potential lead 12 and control output lead 45 of the master dimming circuit. It will be apparent that if the leads 49, 50 are connected across the same alternating current source as the master dimming circuit, the lead 52 may be connected to lead 49 internally thereby eliminating the need for external lead 52.

As shown in FIG. 2, the transformer 35' has a primary winding 36' connected across control input leads 52, 53 and secondary windings 37', 38'. However, the secondary winding 38' can be readily eliminated by connecting conductor 54 with the control output lead 53. In such an arrangement, only the secondary winding 37' would be magnetically coupled with the primary winding *36'* [30'].

If it becomes necessary to adjust the intensity levels of the slave dimming circuit lamp banks with each other and the intensity level of the lamp bank energized by the master dimming circuit for a given setting of the intensity control of the master unit, a rheostat may be connected in series with primary winding 36'. The slave circuit or dimmer shown in FIG. 2 is capable of supplying power and controlling the luminous intensity of the same number of lamps as the master dimming circuit. An advantage of the slave dimming circuit in accordance with the invention is that it has fewer parts and does not require an individual intensity control device of its own, thereby resulting in a more flexible and less expensive dimming system in which the control of a larger number of lamp banks from a single central control station is [is] facilitated.

Referring now to FIG. 3, the master dimmer or dimming circuit represented by the dashed rectangle 11 and the slave dimmers or dimming circuits represented by the dashed rectangles 18 are shown connected in a dimming system for operating a plurality of lamp banks. The external leads 31, 32, 47 of the master dimmer are connected to ballast supply lines 55, 56, 57, that provide power to the bank of lamps 58, 59, 60, 61. These lamps illustrate the manner in which arc discharge lamps may be connected across the supply lines 55, 56, 57. Similarly, the external leads 31′, 32′, 47′ of the slave dimmers are connected to ballast supply lines 55′, 56′, 57′ so that a plurality of lamps represented by the lamps 58′, 59′, 60′ can be energized.

It will be noted that only the master dimmer has an intensity control 40. In accordance with the invention, the [intensity] control 40 which would normally be used to control one dimming circuit is used to control a plurality of circuits and lamp banks. The external leads 12, 13 are provided for connecting the master dimmer with a source of alternating current. A pair of master control output lines 62, 63 are connected with external leads 12, 45 and provide a control output to the control networks of a plurality of slave dimmers, two of which are illustrated in FIG. 3. The external leads 52, 53 connect the slave dimmers across the control output lines 62, 63. External leads 49, 50 are provided for connection with a source of alternating current where 49 is connected to the same line as 12 and 50 is connected to the same line as 13. Although, as shown in FIG. 3, two slave dimmers and a relatively small group of lamps are illustrated, it will be apparent that many more slave dimmers and lamps may be used.

The ballast circuits illustrated in FIG. 3 are enclosed in the dashed rectangles 65 and include a primary winding 66, a high leakage reactance secondary 67, a magnetic core 68 and cathode heating windings 69, 70. It will be noted that external leads 71, 72, 73 are brought out from the ballast circuit for connection with the ballast output lines *57,* 55, 56 [57] of the master dimmer and output lines *57′,* 55′, 56′ [57′] of the slave dimmers. Although in the illustrative embodiment of the invention the ballasts 65 operate a single lamp, it will be apparent that the dimming system in accordance with the invention is adaptable to ballasts which operate more than one lamp.

Having reference to the vector diagram shown in FIG. 4 and the circuits shown in FIGS. 1, 2 and 3, the operation of the circuit will now be more fully described. The operation of the dimming system is initiated by energizing the power input leads 12, 13 and 49, 50 of the master and slave dimmers. Having specific reference to FIGS. 1 and 4, vector AC represents the applied line and anode voltage. Vector AO represents the voltage across either of the secondary windings 19, 20 of the transformer 14. Both the supply voltage vector AC and the voltage vector AO are constant in magnitude and phase. The voltage drop across the primary winding 36 of transformer 35 is represented by vector AB which is variable in magnitude and phase. Vector BC represents the drop across the total resistance in series with the primary winding 36 of transformer 35. Since the sum of vectors AB and BC must be equal to the line voltage, a change of the setting of the intensity control 40 has the effect of moving vector AB along the semicircle 75. Thus, as the resistance provided by the intensity control 40 is increased, it will be seen that the vector BC will approach the vector AC.

The voltage induced in either of the secondary windings 37, 38 of transformer 35 is represented by the vector AF. The turns ratio of transformer 35 is such that the maximum magnitude of vector AF is twice the magnitude of the vector AO. The grid-to-cathode voltage of the triodes 23, 24 is the sum of vectors AO and AF. The dashed lines 77 show the vector addition that results in vector AD, which is constant in magnitude but lags the anode voltage vector AC by an angle which varies from zero to 180 degrees along semicircle 76. When the series resistance provided by the intensity control 40 is decreased, the magnitude of the vector BC decreases and the phase difference between vector AB and vector AC also decreases. This results in an increase in the phase angle of the grid-to-cathode voltage vector AD and a shorter period of conduction for the triodes 23, 24. If the total resistance in series with the primary winding 36 of transformer 35 were equal to zero, the phase angle would be 180 degrees. In this condition, the circuit would not permit any current to flow to the lamps. Therefore, a resistor 39 may be provided in series circuit with the variable resistance of the intensity control 40 to provide a minimum brightness point when the intensity control is at a setting of zero resistance.

A voltage having the magnitude and phase angle of vector AD is supplied to the master dimmer and to each of the slave dimmers by control output lines 62, 63 as shown in FIG. 3. Depending upon the polarity of the voltage across the primaries 36, 36′ of transformers 35, 35′ at any given instant, this voltage will cause one of the gas triodes to conduct when its anode is positive with respect to the cathode and its grid voltage is essentially zero and to return to a nonconducting state when the polarity reverses. Thus, during each cycle of the alternating current supply, one of the gas triodes of both master and all the slave dimmers will fire for an interval during the first half cycle and the other gas triode during each second half cycle.

As previously described, the gas triodes 24, 24′ when triggered provide a path of current flow form the external leads 32, 32′, respectively, through the anodes, cathodes and the center tap of the cathode windings 18, 18′ to the high potential side of the alternating current source or external leads 31, 31′. When the gas triodes 23, 23′ are in a conducting state, a path of current flow is provided from external leads 31, 31′ to 32, 32′, respectively. Thus, the gas triodes of the master dimmers and in the slave dimmers operate in the same manner to place two of the output leads in closed circuit relationship during the interval in each half cycle during the time the triode conducts current.

A dimming system illustrated in FIG. 3 comprised of one master dimmer and nine slave dimmers was operated to supply a current to 320 fluorescent lamps rated at 40 watts each. The following constants of the circuit components are cited by way of example and are not intended to limit the invention in any way:

| | |
|---|---|
| Gas triodes **23, 24, 23′, 24′** | GL 6807 thyratrons. |
| Capacitors **42, 42′** | .0005 microfarads. |
| Resistors **33, 34, 33′, 34′** | 56,000 ohms. |

TRANSFORMER 14

| | |
|---|---|
| Primary winding **15** | 340 turns of .0253 inch wire. |
| Secondary winding **16** | 313 turns of .0179 inch wire. |
| Secondary windings **19, 20** | 90 turns of .010 inch wire. |
| Secondary winding **21** | 74 turns of .010 inch wire. |
| Cathode heating windings **17, 18** | 8 turns of .175 x 0.80 inch rectangular wire. |

TRANSFORMER 35

| | |
|---|---|
| Primary winding **36** | 606 turns of .0126 inch wire. |
| Secondary windings **37, 38** | 1700 turns of .0071 inch wire. |

TRANSFORMER 35′

| | |
|---|---|
| Primary and secondary windings **36′, 37′, 38′** | 4920 turns of .0028 inch wire. |

TRANSFORMER 51

| | |
|---|---|
| Primary winding **15'** | 340 turns of .0253 inch wire. |
| Secondary winding **16'** | 313 turns of .0179 inch wire. |
| Cathode heating windings **17' 18'** | 8 turns of .175 x .080 inch rectangular wire. |
| Intensity control **40** | 0–500 ohms. |
| Resistor **39** | 100 ohms. |
| Ballast | General Electric Catalogue 89G541. |

The dimming system having the foregoing circuit constants was operated from a 118 volt supply and each dimming circuit or dimmer operated 32 lamps. One master dimmer and nine slave dimmers were employed in the system. The nine slave dimmers were controlled by the intensity control on the master dimmer.

A significant advantage of the present invention is that one intensity control element extremely compact in size permits the luminous output of a substantial plurality of fluorescent lamps to be reliably and positively controlled. Further, appreciable savings are realized in that fewer parts are required in the circuits of the slave dimmers.

It will be understood that various specific circuits which have been described herein are intended as illustrative examples of the invention and that the invention is not limited to such examples. Further, it will be apparent that semiconductive devices such as silicon controlled rectifiers can be substituted for the gas triodes and that many other modifications of the particular embodiments of the invention described herein may be made. It is to be understood, therefore, that I intend by the the appended claims to cover all such modifications that fall within the true spirit and scope of the invention.

What I claim as new and desire to secure by Letters Patent of the United States is:

[1. A master dimming circuit for controlling the luminous intensity of a plurality of arc discharge lamps energized from a source of alternating current voltage comprising: a pair of electronic switches; a pair of input leads adapted for connection with said source of alternating current voltage; output means including at least a pair of output leads; a transformer means having a primary connected across said input means and a secondary connected in circuit with said output means; circuit means connecting said pair of electronic switches with said pair of output leads so that when either of said electronic switches are closed, said pair of output leads are in closed circuit relationship with said transformer means; a phase shifting circuit means connected in circuit with said electronic switches for providing a control voltage to drive said switches, said control voltage being substantially constant in magnitude but variable in phase difference with respect to said source voltage and said phase shifting circuit means including a variable impedance adapted to vary said phase difference and to regulate the internal during each half cycle when said switches are closed, thereby controlling the interval of current conduction during each half cycle supplied to said lamps, said phase difference decreasing as the impedance provided by said variable impedance is increased; and control output means adapted to supply said control voltage externally from said master dimming circuit to other dimming circuits.]

[2. The dimming circuit as set forth in claim 1 wherein the electronic switches are gas triodes having an anode, cathode and grid and said control voltage provided by said phase shifting circuit means is applied across the grid and cathode of said gas triodes.]

3. A master dimming circuit for controlling the luminous intensity of a plurality of arc discharge lamps energized from a source of alternating current voltage comprising: a pair of thyratrons, each having an anode, cathode and grid; a pair of input leads adapted for connection with said source of alternating current voltage, one of said cathodes being connected in circuit with one of said input leads and *one of said anodes* [the other of said cathodes] being connected in circuit with *said one* [the other] of said input leads; a first transformer means having a primary connected across said input *leads* [means] and having at least a first, a second and a third secondary winding; a second transformer means having a primary winding and a first and a second secondary winding; a variable impedance connected in series circuit *relationship* [relationships] with said primary winding of said second transformer means and said third secondary winding of said first transformer means, said first secondary winding of said first transformer means and said first secondary winding of said second transformer means being connected in series circuit *and* with the grid of one of said thyratrons so as to provide a grid-to-cathode voltage constant in magnitude but variable in phase difference with respect to the voltage of said source to fire said one of said thyratrons during each positive half cycle and said second secondary winding of said first transformer means and the second secondary winding of said second transformer means being connected in series circuit *and* with the grid of the other of said thyratrons so as to provide a grid-to-cathode voltage constant in magnitude but variable in phase difference with respect to the voltage of said source to fire the other of said thyratrons during each negative half cycle, said phase difference being varied by said variable impedance to control the interval in each half cycle during which said thyratrons conduct current, said phase difference decreasing as said impedance is increased; output means including at least a pair of output leads; circuit means connecting said pair of thyratrons with said pair of output leads so that when either of said thyratrons are conducting said pair of output leads *is* [are] in closed circuit *relation with one side of said source* [difference with said first transformer] and a lead connected with one of said series circuits providing a grid-to-cathode voltage in order to supply said voltage externally from said master dimming circuit.

4. A system for controlling the luminous intensity of a plurality of lamp banks energized from a source of alternating current voltage comprising: a master dimming circuit having input leads adapted for connection with said source of alternating current voltage and lamp output means including at least a pair of output leads, said master dimming circuit comprising: a first pair of electronic switches, a first transformer means having a primary connected across said input leads and a secondary connected in circut with said *one of said output leads* [output means], means connecting said first pair of electronic switches in circuit with said pair of output leads so that when any of said electronic switches are closed, said pair of output leads are in closed circuit relationship, a phase shifting circuit means connected with said electronic switches for providing a control voltage to drive said switches, said *control* [controlled] voltage being substantially constant in magnitude but variable in phase relationship with said alternating voltage, said phase shifting circuit means including a variable impedance adapted to vary said phase relationship and regulate the interval during each half cycle when said switches are closed thereby controlling the interval of current conduction to said lamps during each half cycle, and control output means adapted to supply said control voltage externally from said master dimming circuit; and at least one slave dimming circuit having a pair of input leads adapted for connection with a source of alternating current voltage and an output means including at least a pair of output leads, said slave dimming system comprising a second pair of electronic switches, a second transformer means having a primary connected across said input leads of said slave circuit and a secondary connected in circuit with said output means of said slave circuit, a second circuit means connecting said pair of electronic switches in circuit with said pair of output leads so that when either of said second pair of electronic switches are closed, said pair of output leads of said slave circuit are in closed circuit relationship *with one side of said source*; and means connecting said control output means of said master dimming circuit with said second pair of electronic switches, said phase shifting circuit of said master circuit thereby regulating the interval during each half cycle when said second pair of electronic switches are closed.

5. The system set forth in cliam 4 wherein said first and second pairs of electronic switches are gas triodes, each having an anode, cathode and grid, and wherein said control voltage provided by said phase shifting circuit means is applied across the grid and cathode of said gas triodes.

6. A system for controlling the luminous intensity of a plurality of arc discharge lamps energized from a source of alternating current voltage comprising a master dimming circuit and a plurality of slave dimming circuits, each of said master and slave circuits having: (1) *input* [inputs] leads adapted for connection with said source of alternating votlage, (2) output means having at least a pair of output leads, (3) a pair of electronic switches, (4) a transformer means having a primary connected across said input leads and a secondary connected in circuit with *one of* said output *leads* [means], (5) means connecting each pair of *electronic* [electric] switches in circuit respectively with said pair of output leads so that when any of said electronic switches *is* [are] closed, *said one of said* [each of said pair of] output leads *is* [are] in closed circuit relationship *and connected to one side of said source*; said master dimming circuit including a phase shifting circuit means connected with said electronic switches of said master circuit for providing a control voltage to drive all of the electronic switches of said master and slave circuits, and control output means for supplying said control voltage to said slave circuits, said control voltage being substantially constant in magnitude *but* [with] variable in phase relationship with respect to said alternating current voltage, said phase shifting circuit means including a variable impedance adapted to vary said phase relationship and regulate the interval during each half cycle when all of said electronic switches are closed thereby controlling the interval of current *conduction* [condition] in each half cycle to said lamps, and said slave dimming circuit having a circuit means connected with said control output means of said master dimming circuit to supply said control voltage to said electronic switches of said slave circuits.

7. A system for controlling the luminous intensity of a plurality of arc discharge lamps as set forth in claim 6 wherein said electronic switches are thyratrons, each having an anode, cathode and grid and wherein said control voltage is applied across said rigid and cathode of said thyratrons.

References Cited by the Examiner

The following references, cited by the Examiner, are of record in the patented file of this patent or the original patent.

UNITED STATES PATENTS

| | | | |
|---|---|---|---|
| 2,039,043 | 4/1936 | Westendrop | 315—100 |
| 2,103,439 | 12/1937 | Swart | 315—100 |
| 2,141,937 | 12/1938 | Schroter | 318—204 |
| 2,242,105 | 5/1941 | Brettell | 315—182 |
| 2,310,101 | 2/1943 | Lord | 315—201 |
| 2,665,394 | 1/1954 | Arvidsson | 315—278 X |
| 2,954,509 | 9/1960 | Izenour | 315—199 |

JOHN W. HUCKERT, *Primary Examiner.*

JAMES D. KALLAM, DAVID J. GALVIN, *Examiners.*

D. E. PITCHENIK, J. D. CRAIG, *Assistant Examiners.*